(12) United States Patent
Song et al.

(10) Patent No.: US 10,136,456 B2
(45) Date of Patent: Nov. 20, 2018

(54) METHOD AND APPARATUS FOR CONFIGURING RADIO RESOURCE

(71) Applicant: ELECTRONICS AND TELECOMMUNICATIONS RESEARCH INSTITUTE, Daejeon (KR)

(72) Inventors: Pyeong Jung Song, Daejeon (KR); Jongtae Song, Daejeon (KR); Tae Whan Yoo, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 83 days.

(21) Appl. No.: 15/343,991

(22) Filed: Nov. 4, 2016

(65) Prior Publication Data

US 2017/0135099 A1    May 11, 2017

(30) Foreign Application Priority Data

Nov. 6, 2015  (KR) .................. 10-2015-0156142
Nov. 2, 2016  (KR) .................. 10-2016-0145411

(51) Int. Cl.
| | | |
|---|---|---|
| H04W 72/04 | (2009.01) | |
| H04B 17/318 | (2015.01) | |
| H04W 76/10 | (2018.01) | |
| H04W 76/04 | (2009.01) | |
| H04W 16/02 | (2009.01) | |
| H04W 72/08 | (2009.01) | |
| H04W 76/16 | (2018.01) | |
| H04W 76/15 | (2018.01) | |
| H04W 76/25 | (2018.01) | |

(52) U.S. Cl.
CPC ......... *H04W 76/045* (2013.01); *H04W 16/02* (2013.01); *H04W 72/087* (2013.01); *H04W 76/15* (2018.02); *H04W 76/16* (2018.02); *H04W 76/25* (2018.02); *H04W 72/048* (2013.01)

(58) Field of Classification Search
CPC . H04W 16/02; H04W 72/048; H04W 72/087; H04W 76/045; H04W 76/15; H04W 76/16; H04W 76/25
See application file for complete search history.

(56) References Cited

U.S. PATENT DOCUMENTS

| | | | |
|---|---|---|---|
| 8,553,626 B2 | 10/2013 | Cheong et al. | |
| 2008/0085723 A1* | 4/2008 | Tsao | H04W 16/08 455/452.2 |
| 2009/0180430 A1* | 7/2009 | Fadell | H04L 12/5695 370/329 |

(Continued)

FOREIGN PATENT DOCUMENTS

| | | |
|---|---|---|
| KR | 10-1449343 B1 | 10/2014 |
| KR | 10-2015-0067641 A | 6/2015 |

*Primary Examiner* — Kashif Siddiqui
(74) *Attorney, Agent, or Firm* — Rabin & Berdo, P.C.

(57) ABSTRACT

Disclosed herein are a method and an apparatus for configuring a radio resource. In a wireless communication system, a radio resource is split into a plurality of radio resource slices corresponding to different service types and a radio source slice corresponding to a service type among a plurality of radio resource slices that a device requests is determined.

19 Claims, 15 Drawing Sheets

(56) References Cited

U.S. PATENT DOCUMENTS

| | | | |
|---|---|---|---|
| 2010/0113044 A1* | 5/2010 | Lunter | H04W 72/087 455/450 |
| 2013/0250821 A1* | 9/2013 | Chun | H04B 7/022 370/280 |
| 2014/0225776 A1* | 8/2014 | Harel | H01Q 3/00 342/373 |
| 2014/0295859 A1* | 10/2014 | Shin | H04B 7/026 455/450 |
| 2015/0049697 A1 | 2/2015 | Worrall et al. | |
| 2015/0063316 A1 | 3/2015 | Cho et al. | |
| 2015/0110008 A1 | 4/2015 | Puthenpura et al. | |

\* cited by examiner

FIG. 11

| Service requirement / Service / Application | mReq-1 (Large capacity) | mReq-2 (Low latency) | mReq-3 (Short packet) | mReq-4 (Mobility _level) | mReq-5 (Reliability _level) | mReq-6 (Security _level) | Service Type |
|---|---|---|---|---|---|---|---|
| Service / Application 1 | 1 | 0 | 0 | 0 | 0 | 0 | sType(#1) (e.g, eMBB) |
| Service / Application 2 | 1 | 1 | 0 | 0 | 0 | 0 | sType(#2) |
| Service / Application 3 | 1 | 0 | 0 | 0 | 1 | 1 | sType(#m) |

METHOD AND APPARATUS FOR CONFIGURING RADIO RESOURCE

CROSS-REFERENCE TO RELATED APPLICATION

This application claims priority to and the benefit of Korean Patent Application Nos. 10-2015-0156142 and 10-2016-0145411 filed in the Korean Intellectual Property Office on Nov. 6, 2015 and Nov. 2, 2016, the entire contents of which are incorporated herein by reference.

BACKGROUND OF THE INVENTION (a) Field of the Invention

The present invention relates to a method and an apparatus for configuring a radio resource.

(b) Description of the Related Art

An international telecommunication union-radio communication sector (ITU-R) has suggested key capabilities capable of supporting various service requirements such as large capacity (for example: enhanced mobile broadband (eMBB), low latency (or ultra machine type communication (uMTC)), and massive connectivity (for example: massive machine type communication (mMTC)) as basic requirements of 5G ($5^{th}$ generation).

For this purpose, there is a need for a flexible radio frame structure capable of improving utility of a frequency resource and reducing overhead of a radio channel while simultaneously accepting these requirements However, radio frame structures of the existing mobile communications (for example: long term evolution (LTE)/long term evolution-advanced (LTE-A)) have limitation and inefficiency in satisfying various service characteristics such as low latency, hyper connection, or the like since a basic allocation unit of a subcarrier and a symbol resource is fixed.

SUMMARY OF THE INVENTION

The present invention has been made in an effort to provide a method and an apparatus for configuring a radio resource having a more flexible structure.

An exemplary embodiment of the present invention provides an apparatus for configuring a radio resource in a wireless communication system, including: a transceiver transmitting/receiving a signal through an antenna; and a processor connected to the transceiver and performing a configuration of the radio resource, wherein the processor splits the radio resource into a plurality of radio resource slices corresponding to different service types and determines the radio resource slice corresponding to the service type that the device requests, among the plurality of radio resource slices.

The radio resource may be a radio frame resource including a frequency resource and a time resource and each of the radio frame resources may be split into a plurality of radio frame tiles corresponding to the different service types.

The radio frame resource may be split into a plurality of radio frame tile based on any one of a method of splitting the radio frame resource into a plurality of radio frame tiles based on a frequency resource, a method of splitting the radio frame resource into the plurality of radio frame tiles based on a time resource, a method of splitting the radio frame resource into the plurality of radio frame tiles based on a third resource that is at least one of power and a code, and a method of randomly splitting the radio frame resource into the plurality of radio frame tiles based on the frequency resource and the time resource.

When a spatial division multi-beam is used, the radio resource may be beam resources and each of the beam resources may be split into a plurality of beam slices corresponding to different service types. Beam slices corresponding to the different service types may be generated by adjusting at least one of a coverage, a beam width, and a bean angle of the beam resource.

The wireless communication network system may include: a primary cell access network; and at least one secondary cell access network added according to the service type that a device requests, and the processor may allocate radio resource slices corresponding to the different service types to the primary cell access network and the secondary cell access network, respectively.

The primary cell access network may be an access network connected as a default when trying a new connection according to a new call, and the processor may connect the device connected through the primary cell access network to a secondary cell access network corresponding to the service type that the device requests.

Another embodiment of the present invention provides a wireless communication system, including: a primary cell access network; and at least one secondary cell access network added according to a service type that a device requests, wherein radio resource slices corresponding to different service types are allocated to the primary cell access network and the secondary cell access network, respectively.

The radio resource may be a radio frame resource including a frequency resource and a time resource and radio frame resources may be each split into a plurality of radio frame tiles corresponding to the different service types.

When a spatial division multi-beam is used, the radio resource may be a beam resource and the beam resources may be each split into a plurality of beam slices corresponding to different service types.

The primary cell access network may be an access network corresponding to a cell having a largest coverage radius while received strength among received signal strengths of adjacent cells that a device reports is equal to or more than a communication quality threshold value and may be a network connected as a default when trying a new connection according to a new call.

The wireless communication system may further include: an access network controller determining a secondary cell access network and a radio resource slice which correspond to a service type that the device connected through the primary cell access network requests and notifying the device of the determined secondary access network and radio resource slice.

The device may be connected to the secondary cell access network notified from the access network controller to form a multi-connection state, in a state in which maintaining a connection with the primary cell access network.

Yet another embodiment of the present invention provides a method for configuring a radio resource in a wireless communication system, including: splitting, by an apparatus for configuring a radio resource, the radio resource into a plurality of radio resource slices corresponding to different service types and determining a radio resource slice corresponding to a service type that a device requests; and notifying, by the apparatus for configuring a radio resource, the device of the determined radio source slice.

The determining includes: receiving, by the apparatus for configuring a radio resource, a message including a service type from the device; determining, by the apparatus for configuring a radio resource, an access network corresponding to the service type; and determining, by the apparatus for configuring a radio resource, a radio resource slice corresponding to the service type.

The notifying may include: providing, by the apparatus for configuring a radio resource, information on the determined radio resource slice to the determined access network; and providing, by the apparatus for configuring a radio resource, information on the determined access network and radio resource slice to the device.

In the determining, the apparatus for configuring a radio resource may determine one of a plurality of secondary cell access networks based on a service type acquired from the device connected through a primary cell access network.

The radio resource may be a radio frame resource including a frequency resource and a time resource and radio frame resources may be each split into a plurality of radio frame tiles corresponding to the different service types.

When a spatial division multi-beam is used, the radio resource may be beam resources and each of the beam resources may be split into a plurality of beam slices corresponding to different service types.

BRIEF DESCRIPTION OF THE DRAWINGS

FIG. 11 is an exemplified diagram illustrating a menu list displayed on a device for setting a service type according to an exemplary embodiment of the present invention.

DETAILED DESCRIPTION OF THE EMBODIMENTS

Figure 1:
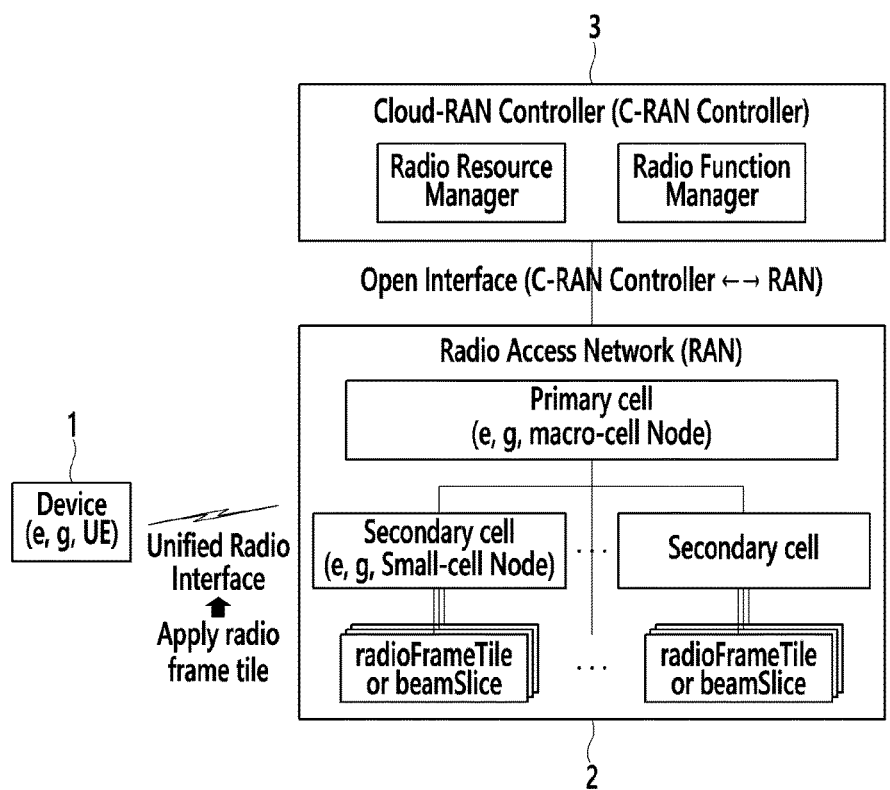
FIG. 1 is a diagram illustrating a structure of a wireless communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

Hereinafter, a method and an apparatus for configuring a radio resource according to an exemplary embodiment of the present invention will be described with reference to the accompanying drawings.

According to an exemplary embodiment of the present invention, a radio frame tile represents an optimal radio frame structure configured to meet a service type and is a structure in which a structure of a radio resource (for example, subcarrier-spacing, symbol-duration) applied according to the service type is changed.

A beam slice may mean a radio beam and the service type (sType) may mean service requirements, in which the service type may be classified according to service request characteristics such as a radio packet transmission speed, a radio packet delay, and a radio packet transmission error rate. An example of the service type may include enhanced mobile broadband (eMBB), ultra machine type communication (uMTC), massive machine type communication (mMTC), best effort, or the like.

A cell type (cellType) has a cell coverage changed according to frequency band characteristics. An example of the cell type may include a macro cell, a small cell, or the like. A cell slice represents some pieces of a cell consisting of the cell type and the radio frame tile (or beam slice).

A device is collectively called several types of terminal equipment (for example, UE, vehicle, sensor, robot, or the like) or a subscriber.

A primary cell is a primarily connected cell when the device requests a service at an early stage of a call setup. The primary cell is cell that is connected to support seamless continuity of communications when there are a lot of island type cells such as a hot spot cell. A secondary cell is a secondarily connected cell after the device is connected to the primary cell and may be used to support service types such as large capacity and low latency.

FIG. 1 is a diagram illustrating a structure of a wireless communication system according to an exemplary embodiment of the present invention.

As illustrated in FIG. 1, a wireless communication system includes a device 1, a radio access network (RAN) 2, and a radio access network controller 3 controlling them.

The device 1 may include devices such as a smart device, sensor networking, moving network (for example, V2X), infra-less device networking (for example, enhanced device-to-device (D2D)/MTC). The device (or device network) may be extended to a thing-centric-device to configure a networking form (e.g., sensor/IoT network).

The radio access network (RAN) 2 is classified into the primary cell (for example, macro cell) and the secondary cell (for example, small cell, remote radio head/radio unit (RRH/RU), relay node, or the like) according to characteristics of the cell coverage, or the like. The radio access network (RAN) may have a structure in which it is coupled with the secondary cell based on a control of the primary cell. The primary cell and the secondary cell may have a virtualization based cell slice structure to accept various service requests. For this purpose, a radio interface between the device and a cell node (primary cell, secondary cell) has various types of radio frame tile structures or beam slice structures. These structures are formed in a service-customized type according to a service type that a device requests to meet usages such as large capacity (eMBB, broadband), low latency (uMTC), massive connectivity (mMTC), Internet (for example: best effort), or the like.

The radio access network controller 3 allocates and controls a radio resource and function element configuring the radio access network (RAN) in real time. The radio access network controller 3 may be called a cloud-RAN controller.

The radio access network controller 3, that is, the C-RAN controller 3 includes a radio resource manager (RRM) 31 and a radio function manager, (RFM) 32.

The radio resource manager (RRM) 31 adjusts and manages a scale of radio sources to meet a service request of the device. For example, the radio resource manager (RRM) 31 distributes the scale of radio resources (for example, subcarrier and symbol resource of the radio frame tile) that may be used per service type such as the large capacity, the low latency, and the massive connectivity.

The radio function manager (RFM) 32 allocates appropriate radio function elements to each of the radio resources (radio frame tiles) that is distributed. For example, the radio function manager (RFM) 32 allocates the appropriate radio function elements (for example, waveform, access type, modulation type, coding type, or the like) to the large-capacity service type when "radio frame tile#1" is allocated.

The C-RAN controller 3 having the structure may control and manage various kinds of radio resources and the function thereof in a software way to facilitate scale-up/down of a network resource and variable and quick operation and maintenance of a network.

The C-RAN controller 3 may generally hold a part of a service orchestrator function discussed in a network function virtualization (NFV)/software defined network (SDN) in an agent form. Meanwhile, the service orchestrator is operated in non-real time but the C-RAN controller 3 is operated in real time. The C-RAN controller 3 may be connected to the radio access network (RAN) through an open interface.

Figure 2:
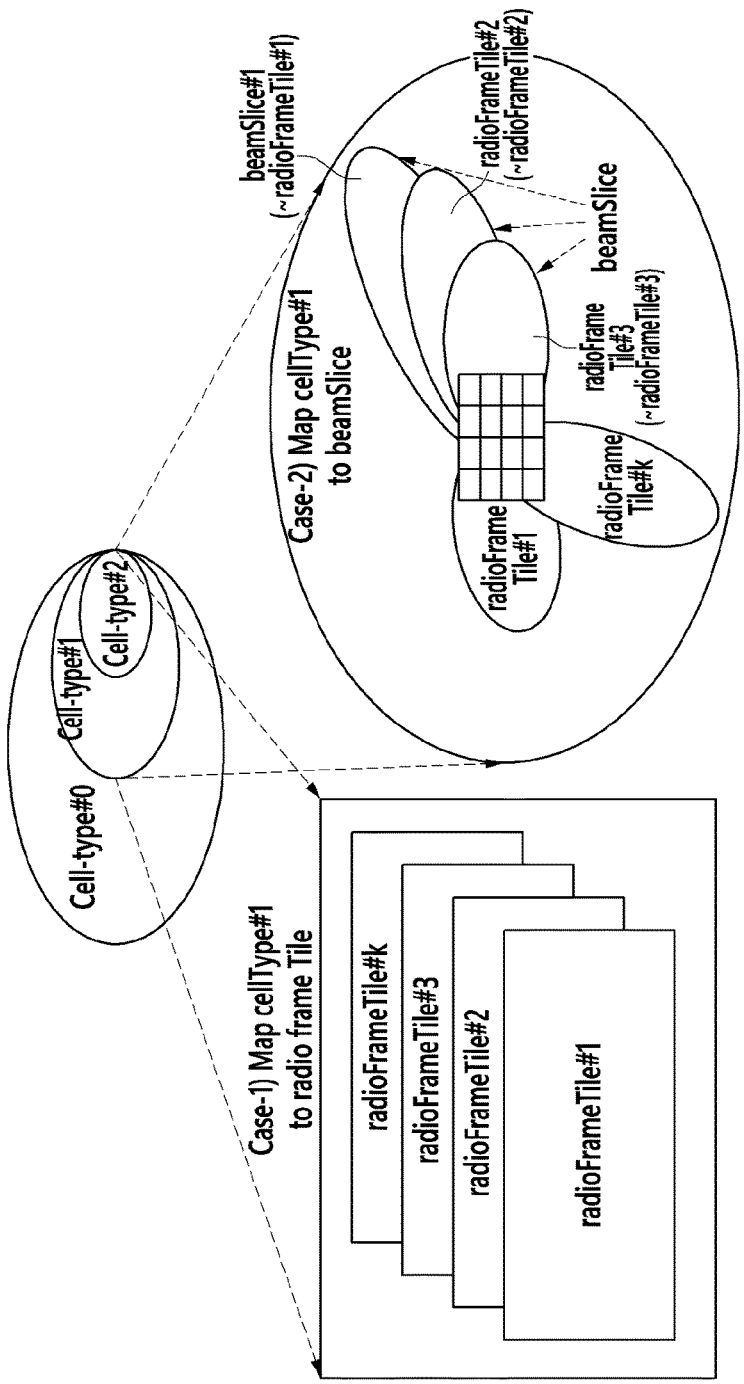
FIG. 2 is a schematic diagram of a radio resource structure according to an exemplary embodiment of the present invention.

FIG. 2 is a schematic diagram of a radio resource structure according to an exemplary embodiment of the present invention.

According to the embodiment of the present invention, the radio resource may be partitioned into a plurality of radio resource slices to support the service types required from various devices and thus may be configured as follows.

case-1) One physical radio frame resource is sliced into a plurality of independent radio frame tiles. The radio frame resource is classified into the plurality of radio frames by adjusting a frequency resource, a time resource, cyclic prefix (CP) spacing, or the like according to various service types such as the low latency and the massive connectivity. The process may be called radio frame tiling. Here, when the frequency resource is adjusted, for example, the subcarrier spacing may be adjusted and when the time resource is adjusted, for example, the symbol duration may be adjusted.

case-2) The beam source is classified into a plurality of radio beams by adjusting the coverage of the beam resource, a beam width, and a beam angle according to various service types such as the low latency and the massive connectivity. The process may be called radio beam slicing.

To configure the radio resource, as illustrated in FIG. 2, the cell type (cellType) suitable for service characteristics is determined in consideration of the cell coverage depending on the frequency band. For example, the cell type (cellType) includes the macro cell (for example, referred to as cellType#0) and the small cell (for example, referred to as cellType#2). For the determined cell type, the radio frame tile is configured to meet service characteristics such as transmission speed and a delay of a radio packet and the radio beam slice is configured.

Figure 3:
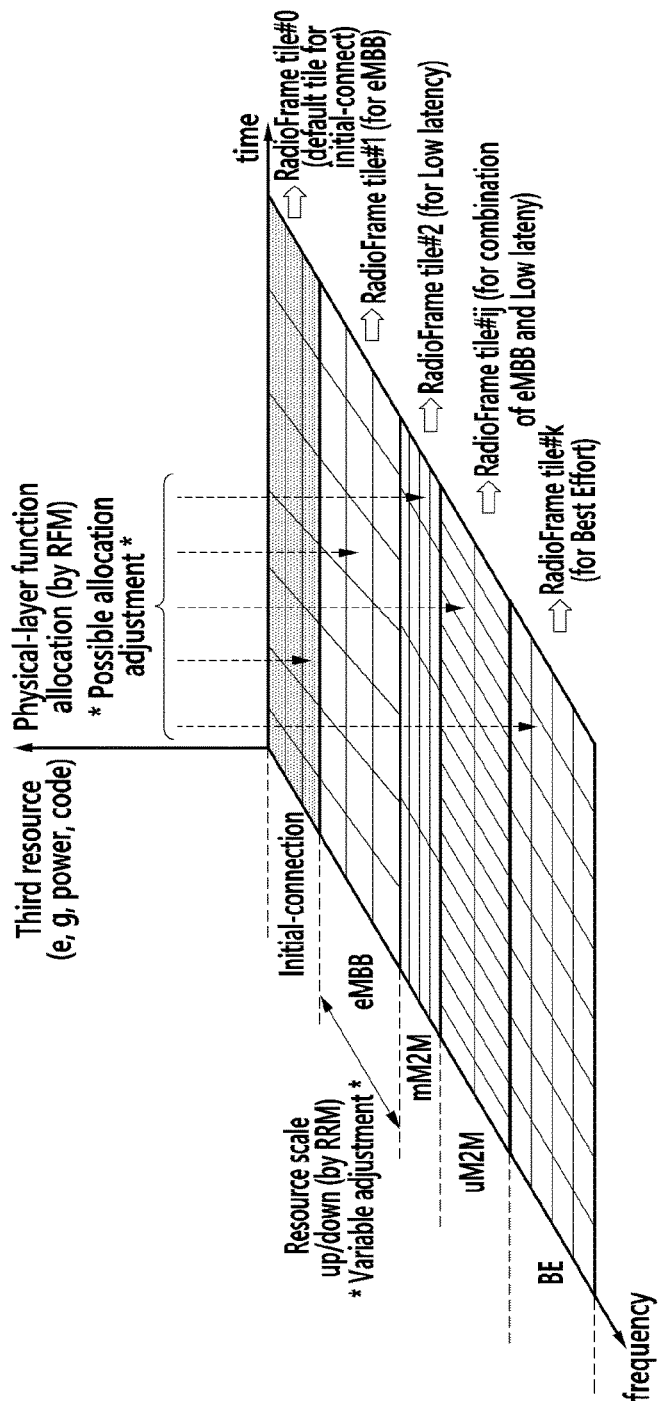
FIG. 3 is a diagram illustrating a radio frame tile according to an exemplary embodiment of the present invention.

FIG. 3 is a diagram illustrating a radio frame tile according to an exemplary embodiment of the present invention.

According to an exemplary embodiment of the present invention, the radio frame tiling that partitions an OFDM-based radio frame resource on a frequency base and a time base according to the service type is performed and thus the radio frame tiles for each service type as illustrated in FIG. 3 are provided.

The partition of the radio frame resource may be made by the following method.

The radio frame resource is partitioned based on the frequency resource.

The radio frame resource is partitioned based on the time resource.

The radio frame resource is partitioned using a third resource (e.g., power, code).

The radio frame resource randomly partitions frequency and time independent of the frequency resource and the time resource.

The exemplary embodiment of the present invention may use at least one of the partition methods as described above to partition the radio frame resource into the plurality of frame tiles. The resource allocation size, that is, the scale of radio resources (frequency, time, or the like) may be changed according to the partition method and the plurality of radio frame tiles having different radio resource scales may be generated. The radio frame tile may be allocated according to the service type. The scale of radio resources allocated to each of the radio frame tiles may be determined at the time of system initialization by the C-RAN controller 3 according to the service type. This will be described below in more detail.

Figure 4:
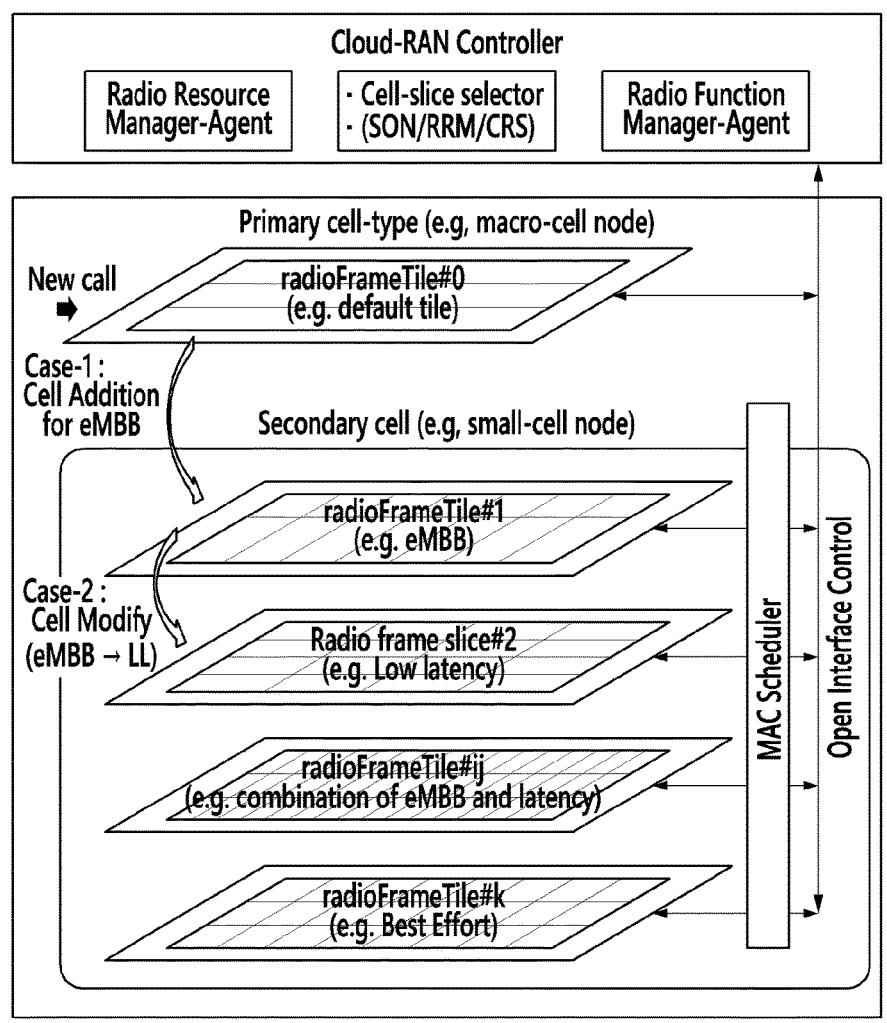
FIG. 4 is a diagram illustrating a process of selecting a cell meeting service requirements and selecting a radio frame tile according to an exemplary embodiment of the present invention.

FIG. 4 is a diagram illustrating a process of selecting a cell meeting service requirements and selecting a radio frame tile according to an exemplary embodiment of the present invention.

The exemplary embodiment of the present invention may apply a virtualization concept to the radio frame resource to slice the radio frame resource into a plurality of independent radio frame tiles.

The radio access network (RAN) has a virtualization-based cell slice structure to accept various service requests as illustrated in FIG. 4.

When the device requests a new connection (or new call) to a wireless communication system, the network (for example: C-RAN controller) may select a default cell type and a default radio frame tile when a specific radio frame tile is defined or in the case of reducing a mobility (mobility/ handover) frequency. For example, as illustrated in FIG. 4, the network may select the primary cell (for example: 5G macro cell) and radio frame tile #0 (radioFrameTile#00 (for example, default frame tile for best-effort) as default. In this case, the network (for example: C-RAN controller) may select, as the primary cell, a cell (for example: macro cell) having a largest coverage radius while having received strength equal to or more than a certain communication quality threshold value among received signal strengths of adjacent cells that the device reports. The information on the default radio frame tile may be informed to the device through a system information block (SIB).

Meanwhile, the radio resource required by the device during communication may be allocated a selected cell type (cellType#T) and the radio frame tile (radioFrameTile#K). In this case, an MAC scheduler allocates the radio resource to the device in real time as much as traffic capacity required by the device. In this case, the frequency resource and the time resource are continuously allocated and a discrete allocation may be selectively performed.

If the received signal strength of the serving cell type is low and the received signal strengths of adjacent cells is equal to or more than a predetermined threshold value during the communication, the device reports measurement values of these received signals to the network. The network (for example: C-RAN controller) selects the 'cell type and radio frame tile' of the secondary cell meeting the service type of the device and informs the device of the selected 'cell type and radio frame tile'. In this case, the device may hold the existing communicating cell type (for example, primary cell, macro cell mode) and add a new cell type (for example, secondary cell, small cell mode) to be simultaneously connected (multi-connected) to a plurality of cells.

When the device requests a modification of the service type during the communication, the network (for example: C-RAN controller) modifies the radio frame tile of the device to the radio frame tile satisfying the corresponding service type. In the structure as illustrated in FIG. 4, the relevant function modules (or apparatuses) are connected to each other through the open interface.

Figure 5:
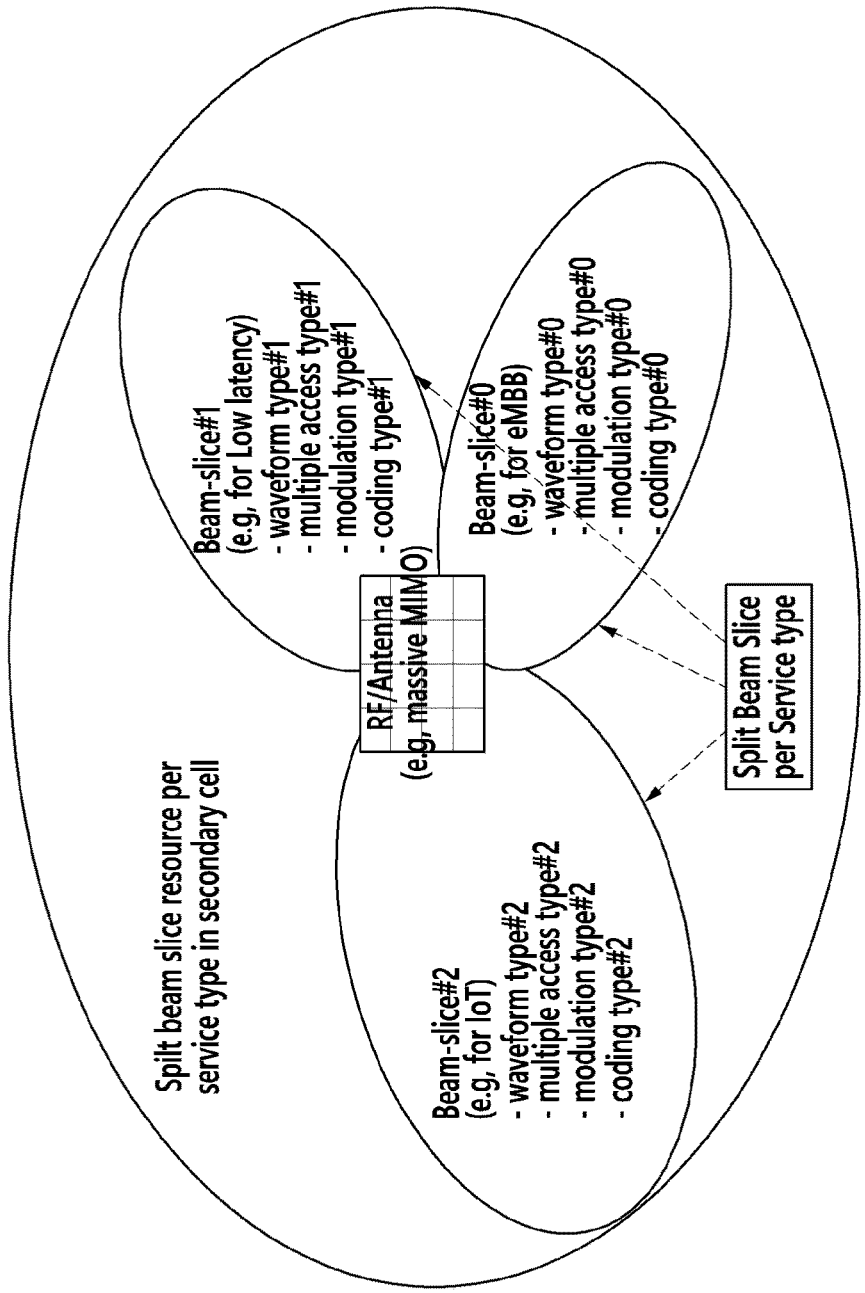
FIG. 5 is a diagram illustrating partition of a beam resource according to an exemplary embodiment of the present invention

FIG. 5 is a diagram illustrating partition of a beam resource according to an exemplary embodiment of the present invention.

According to the exemplary embodiment of the present invention, another method for splitting a radio resource performs beam slicing that splits a radio beam into a plurality of beam slices.

For example, if the device requests a 3D-UHDTV service type, the network (for example: C-RAN controller) selects the cell type of the secondary cell as the small cell using a millimeter wave and allocates a massive antenna-based specific beam slice (beam-slice#0 for eMBB) using a spatial division multi beam as the radio resource. In this case, the beam width of the beam slices, the beam interval between the beam slices, transmission power of the beam slice, an angle at which the beam slice is covered at a horizontal/vertical axis, and the like may be dynamically set. The beam width of the beam slice, the beam interval between the beam slices, the transmission power, the angle, and the like described above may be changed according to the service type.

Further, the network (C-RAN controller) may select the radio function element according to the service type. For example, in the case of the 3D-HDTV service type, the waveform may select a filter bank multi-carrier (FBMC), a multiple-access selects the OFDM, and a modulation type and a coding type may be controlled in real time according to a radio wave measurement result (for example: channel quality indictor (CQI)) of the device. In this way, a specific beam slice (for example: beam-slice#0) is provided in the service-customized type for the 3D UHDTV service.

Figure 6:
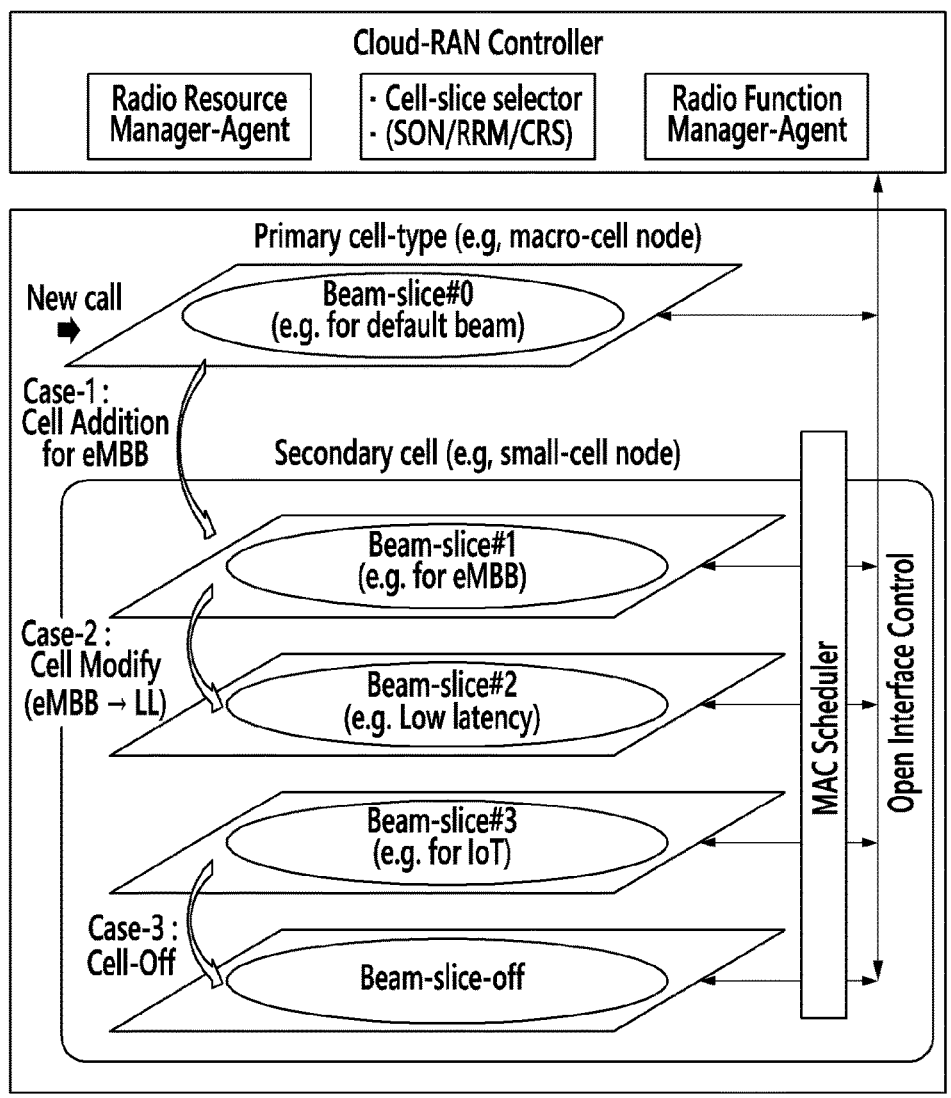
FIG. 6 is a diagram illustrating a process of selecting a cell meeting service requirements and selecting/adding/changing a beam slice according to an exemplary embodiment of the present invention

FIG. 6 is a diagram illustrating a process of selecting a cell meeting service requirements and selecting/adding/changing a beam slice according to an exemplary embodiment of the present invention.

The radio access network (RAN) has the virtualization-based cell slice structure as illustrated in FIG. 6 to accept various service requests and may select, add, or change the generated beam slice when slicing the beam resource into a plurality of independent beams using the virtualization concept. Unless specifically mentioned in the exemplary embodiment of the present invention, the basic operation principle of the beam slice is similar to the radio frame tile.

When the device requests a new connection (or new call) to the radio communication system, the network (for example: C-RAN controller) may select the default cell type and the default beam slice when the beam slice is not defined or in the case of reducing the mobility frequency, for example, may select the primary cell (for example: 5G macro cell) and a beam slice (eamSlice#0) as a default as illustrated in FIG. 6. The beam slice (eamSlice#0) may be selected as the default for the best-effort service type.

The network may select, as the primary cell type, the cell (for example: macro cell) having the largest coverage radius while having the received strength equal to or more than the certain communication quality threshold value among the received signal strengths of adjacent cells that the device reports. The radio resource that the device requests during the communication is allocated to the selected cell type and beam slice. For this purpose, the MAC scheduler allocates the radio resource in real time as much as the traffic volume that the device requests. If the received signal strength of the serving cell type is low and the received signal strengths of adjacent cells is equal to or more than a predetermined threshold value during the communication, the device reports measurement values of these received signals to the network. The network selects the 'cell type and beam slice' of the secondary cell meeting the service type of the device and notifies the device of the selected 'cell type and beam slice'. In this case, the device may hold the existing communicating cell type (for example: primary cell, macro cell mode) and add a new cell type (for example: secondary cell, small cell mode) to be simultaneously connected to the plurality of cells in the multi-connection form.

When the device requests the change in the service type during the communication, the network changes the beam slice of the device to the beam slice satisfying the corresponding service type. When there is no device that serves the specific beam slice, the network powers-off the corresponding beam slice. In the structure as illustrated in FIG. 6, the relevant function modules (or apparatuses) are connected to each other through the open interface.

Figure 7:
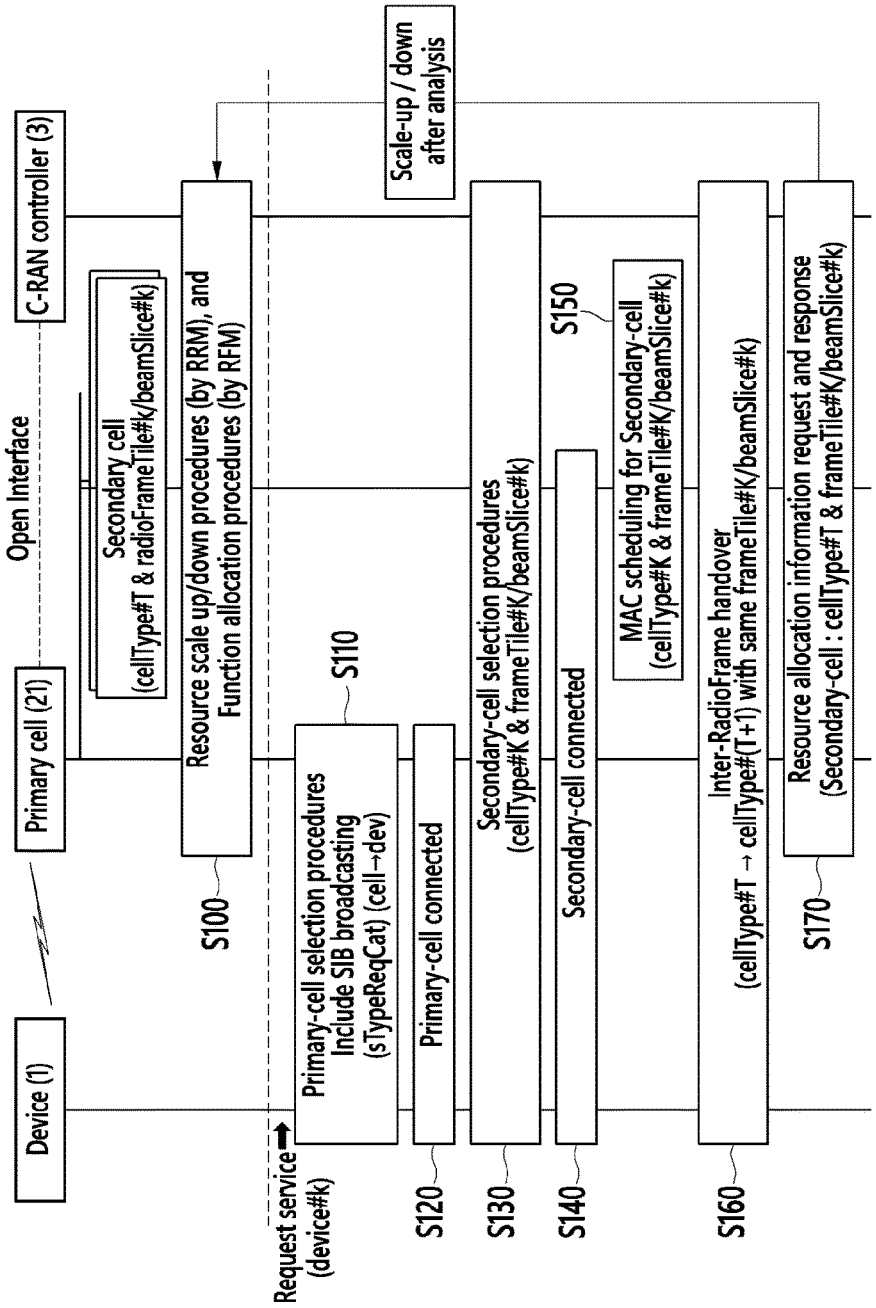
FIG. 7 is a flow chart illustrating a cell selecting procedure according to the exemplary embodiment of the present invention.

FIG. 7 is a flow chart illustrating a cell selecting procedure according to the exemplary embodiment of the present invention.

According to the exemplary embodiment of the present invention, to select the cell (secondary cell, slice cell) meeting the service type, as illustrated in FIG. 7, a procedure of selecting a cell type (cellType#T) and a radio frame tile (radioFrameTile#K) may be performed.

As illustrated in FIG. 7, the C-RAN controller 3 allocates the radio source (radio frame tile/beam slice) and the function element configuring the radio access network (RAN)

per the service type (S100). The device 1 selects the primary cell 21 at the early stage of the call setup (S110).

The primary cell is a first connected cell when the device requests a service. For example, when a lot of island type cells such as a hot spot cell are present, the cell (for example; 5G macro cell, 4G macro cell) having the largest coverage among the adjacent cells is selected. This may be used to improve the seamless continuity of the communication. When the macro cell among the adjacent cells is plural, the cell having the strongest received signal strength may be selected as the primary cell.

As another example, the cell having the strongest received signal strength among the adjacent cells may be selected as the primary cell (for example: 5G small cell).

As another example, any cell among the adjacent cells is set to be a default to be selected as the primary cell. For example, any cell is designated as the massive connectivity IoT dedicated cell and the device for the massive connectivity IoT is directly connected to the massive IoT dedicated cell. For this purpose, the device manages cell identification information for being connected to the massive connectivity IoT dedicated cell, which is the primary cell, in an internal memory. As illustrated in FIG. 4, the radioFrameTile#0 may be allocated to the primary cell and the device 1 transmits/receives a signal through the radioFrameTile#0 of the connected primary cell.

Meanwhile, in step S110 of selecting, by the device, the primary cell, the system information block (SIB) for supporting service type identification that the device 1 requests may be provided to the device.

The system information includes a service type request category (serviceTypeRequestCategory (sTypeReqCat)) list. The service type request category list may include service type request category items which is information for the service type that the cell provides. When service type request category items are not specified in the list of the system information broadcast from the primary cell 2, other available information may be instead transmitted. The device 1 may request any service based on the service type request category items specified in the list of the system information.

For example, when the device 1 requests the large capacity 3D UHDTV service type, if the means for notifying the cell of the service type is a device identifier (Device_ID), the device 1 sets up the Device_ID information in a predetermined parameter (for example: sTypeReqCat) of a predetermined message and notifies the cell of the device_ID information. In this case, as the used message, a radio bearer setup request (radioBearerSetupRequest) message may be used. The device 1 may set up the following information in a predetermined parameter of a radio bearer setup request message (RadioBearerSetup Request) and transmit the setup information.

sTypeReqCat #1=Device_ID
sTypeReqCat #2=Application_ID (or URL_ID)
sTypeReqCat #3=Manual Req_ID
sTypeReqCat #4=serviceType (best effort)

The service type that is not present in the list of the system information (SIB) is setup as the 'best effort'. A process of receiving, by the device 1, system information and performing a response thereto will be described below in more detail.

Meanwhile, the device 1 is connected to the primary cell 21 (S120) and then is connected to the secondary cell corresponding to the service type that the device 1 requests (S130 to S160). For example, as illustrated in FIG. 4, the radio frame tile (radioFrameTile#0) may be allocated to the connected secondary cell and the device 1 transmits/receives the signal through the radioFrameTile#1 of the connected secondary cell. The connection process to the secondary cell will be described below in more detail.

If the device 1 is connected to the secondary cell and then the device 1 requests the radio resource as required for the traffic transmission, the MAC scheduler in the cell (primary cell or secondary cell) allocates the radio resource to the device (S170).

Figure 8:
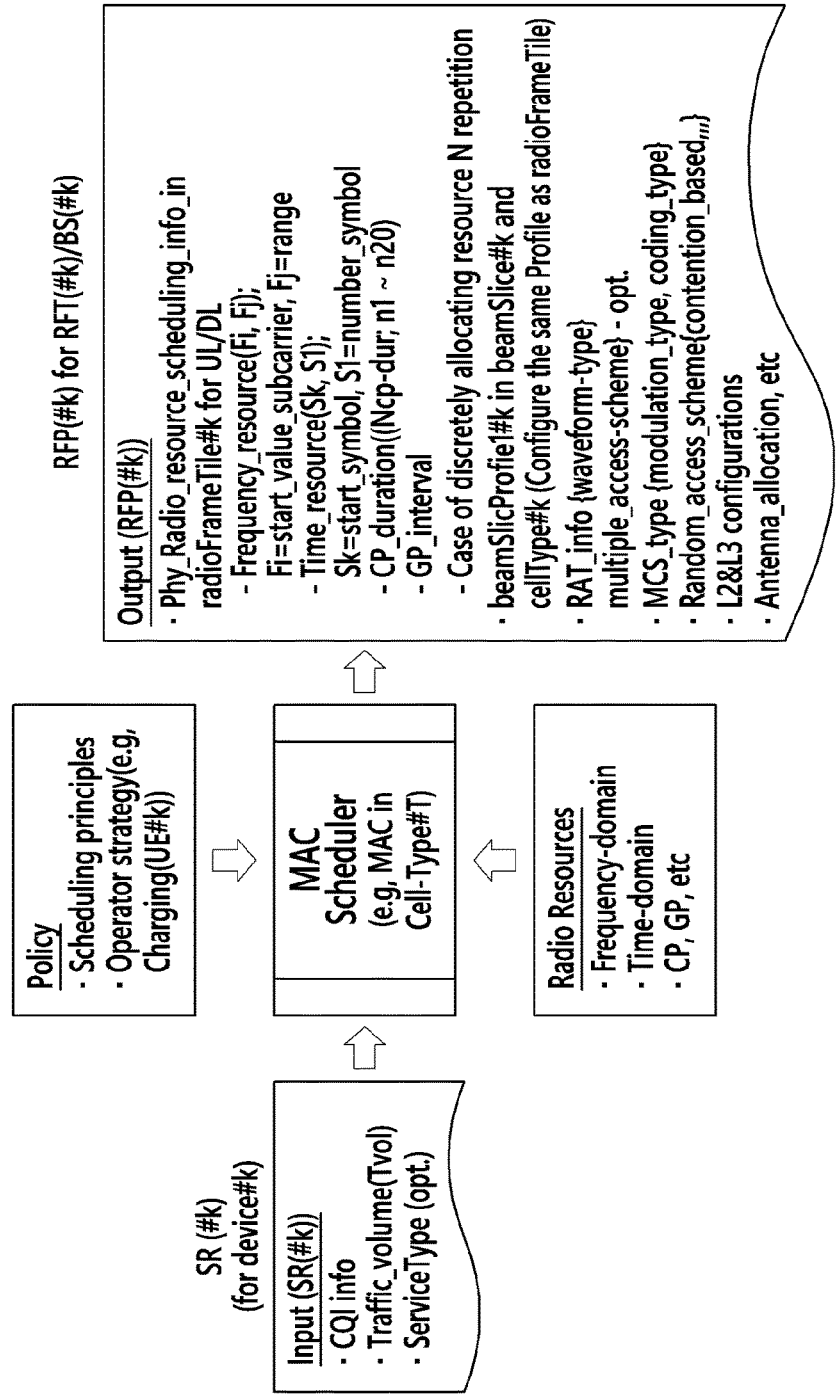
FIG. 8 is an exemplified diagram illustrating radio resource allocation for traffic transmission according to an exemplary embodiment of the present invention.

FIG. 8 is an exemplified diagram illustrating radio resource allocation for traffic transmission according to an exemplary embodiment of the present invention.

Here, the state in which the cell type and the radio frame tile are determined will be described by way of example.

For example, as illustrated in FIG. 8, the MAC scheduler of the secondary cell receives the CQI corresponding to the device 1, the traffic volume of the buffer, and the service type (ServiceType) through the corresponding radio frame tile (radioFrameTile#K) and allocates the radio resource of the uplink (UL)/downlink (DL) traffic based on the information. The radio allocation information may include, for example, the following information.

The physical radio resource allocation information (Physical_radio_resource_scheduling_info_in radioFrameTile#k for UL/DL frequency resource(Frequency_resource(Fi+Fj)) in the radioFrameTile#K for Ul/DL Here, Fi=start_value_subcarrier is that a value representing a start subcarrier and Fj=range represents a value for a frequency range.

Time resource (Time resource(Sk+Sl))

Here, as Sk=start_symbol, this represents the value of the start symbol and as Sl=number_symbol, this represents the number of symbols.

CP duration (CP_duration)

The CP duration may be represented like (integer; Ncp-dur; n1 to n 20).

The modulation type and the coding type (MCS_type{modulation_type, coding_type)}

Random access scheme (Random_access_scheme {for example: contention_based}

L2&L3 configurations and antenna allocation (Antenna_allocation)

In addition to the information, the radio allocation information may further include radio access technology (RAT) information (RAT_Infor), in which the RAT information may include a waveform type (waveform_type), a multiple access scheme (multiple_access_scheme).

Meanwhile, when the radio resource is not continuously allocated but discretely allocated, the radio resource allocation information (Physical_radio_resource_scheduling) is repeatedly allocated as many as the number of split band resources. For this purpose, the MAC scheduler may perform the radio resource allocation in consideration of the scheduling policy and the status information of the radio resource together.

The above-mentioned process of selecting a cell is described based on the radio frame tile, but even the procedure of selecting a cell based on a beam slice is operated similar to the above-mentioned procedure, and therefore the detailed description thereof will be omitted herein.

Next, the process of connecting a device to a secondary cell, that is, the procedure of selecting a secondary cell meeting a service type of a device and configuring optimal secondary cell shape information will be described in more detail.

Figure 9:
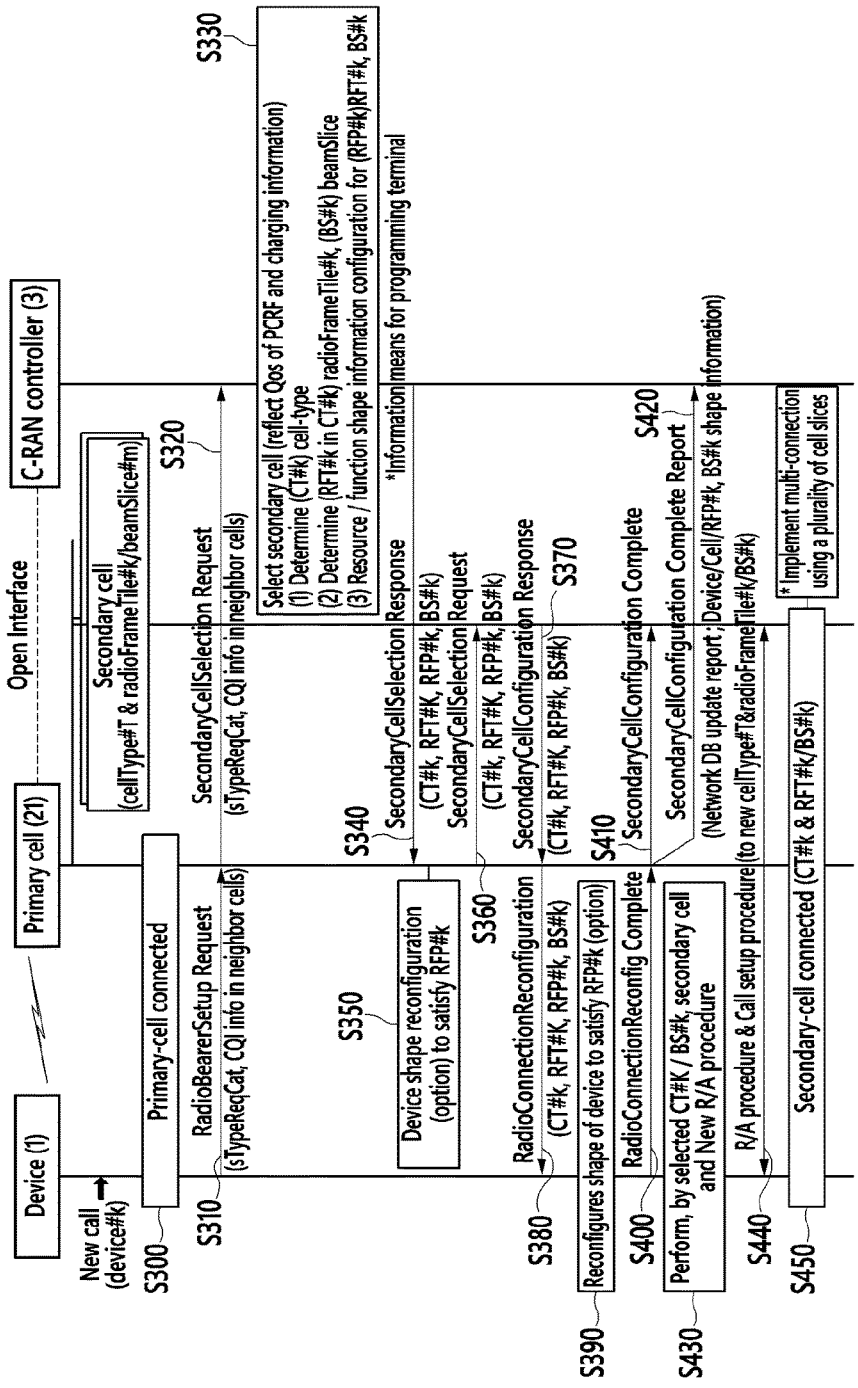
FIG. 9 is a flow chart illustrating a procedure of selecting, configuring, and connecting a secondary cell according to the exemplary embodiment of the present invention.

FIG. 9 is a flow chart illustrating a procedure of selecting, configuring, and connecting a secondary cell according to the exemplary embodiment of the present invention.

In the state (primary cell connected) in which the device is connected to the primary cell, by the network (for example, primary cell, C-RAN controller), the secondary cell (cellType#T, radioFrameTile#k/beamSlice#k) meeting the service type of the device is selected and the optimal secondary cell shape information (RFP#k) is configured.

In detail, the device 1 transmits the radio bearer setup request (RadioBearerSetup Request) message to the primary cell 21 in the state (primary cell connected) (S300) in which it is connected to the primary cell 2 as illustrated in FIG. 9 (S310). The radio bearers setup request message includes the service type request category (serviceTypeReuestCategory (sTypeReqCat)) and the received signal strength measurement values (as CQI, for example, reference signal received power (RSRP), reference signal received quality (RSRQ)) of adjacent cells.

The process of selecting and requesting, by the device 1, a service type request category (serviceTypeReuestCategory (sTypeReqCat)) based on the system information received from the primary cell 21 will be described with reference to FIG. 10.

Figure 10:
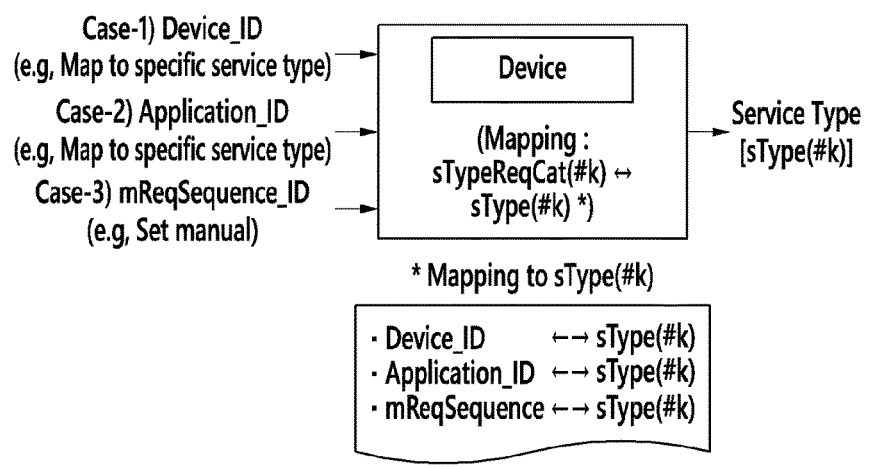
FIG. 10 is an exemplified diagram illustrating a process of selecting a service type of a device according to an exemplary embodiment of the present invention.

FIG. 10 is an exemplified diagram illustrating a process of selecting a service type of a device according to an exemplary embodiment of the present invention.

In the description of FIG. 7, an example of setting, by the device, the service type request category (sTypeRequest) will be described with reference to the information of the service type request category (sTypeRequest) information received from the system information (SIB) received from the primary cell.

As illustrated in FIG. 10, as one method (case-1), the device identifier (Device_ID) may be used. In detail, when the device supports only one specific service type, the service type request category (sTypeReqCat) is set as the device identifier. That is, 'sTypeReqCat(#k)=Device_ID'. The subscriber may designates the detailed requirements (for example: radio packet transmission speed, delay and error rate, or the like) for the service type depending on the service registration information (for example: service type, billing level, or the like) at the time of the service subscription and store the designated requirements in the network (for example: C_RAN controller). Next, the network 1:1 maps the identifier of the corresponding device of a subscriber to the service type like "Device_ID↔sType(#k)". Further, the network identifies the mapped service type (sType(#k)) based on the device identifier (Device_ID) setup in the service type request category (sTypeReqCat) provided from the device.

As another method (case-2), an application identifier (Application_ID) may be used. In detail, the device sets up the service type request category (sTypeReqCat(#k)) as the specific service/application identifier that the device (subscriber) requests. That is, 'sTypeReqCat(#k)=Application_ID'. For this purpose, the network (for example: C_RAN controller) holds a table that 1:1 maps the application identifier (Application_ID) (for example: URL, or the like) per service type.

As anther method (case-3), manual setup may be used. When the subscriber requests the specific service/application, the subscriber may directly select the characteristics of the service type demanding using a menu list (for example, using the touch scheme) automatically displayed on the display that is an interface apparatus of the device.

FIG. 11 is an exemplified diagram illustrating a menu list displayed on a device for setting a service type according to an exemplary embodiment of the present invention.

The subscriber may display the service characteristics (large capacity, low latency, short packet, mobility level, or the like) per service type corresponding the service/application on the display of the device, as illustrated in FIG. 11. In this case, the subscriber may select at least one or two of the service characteristics of the service type. As such, for the service characteristics of the service type selected by the subscriber, a network operator may determine whether to accept the service by determining legitimacy on whether the service request is possible in consideration of a quality of service (QoS), billing, or the like that the corresponding device (or subscriber) registers.

The service type request category (sTypeReqCat(#k)) is setup as a mark sequence (mReqSequence) that is the information corresponding to the service characteristics that the subscriber selects for the service type. That is, sTypeReqCat(#k)=mReqSequence.

For example, if the mark sequence (mReqSequence) that the subscriber manually selects based on the menu list illustrated in FIG. 11 is "100000", 'sTypeReqCat(#k) =100000=>sType #1'.

The information required to setup the service type request category (sTypeReqCat) as described above may be stored in an internal memory (for example: universal subscriber identify module (USIM) card) of the device and used.

The radio bearer setup request message (RadioBearerSetup Request) may be transmitted by the device or the network, if necessary, for the service type change request (sTypeReqCat#k→sTypeReqCat#k+1) during the communication.

The secondary cell meeting the service type that the device requests is selected by the network, based on the radio bearer setup request message including the service type request category (sTypeReqCat).

In FIG. 10, the primary cell 21 transmits the information included in the radio bearer setup request message received from the device 1 to the network, that is, the C-RAN controller 3 through a secondary cell selection request (SecondaryCellSelection Request) message (S320).

The C-RAN controller 3 selects the secondary cell satisfying the service type that the device requests based on the information included in the secondary cell selection request message (S330).

In detail, the C-RAN controller 3 has different cell coverage per frequency band, and therefore determines (determines cellType-CT#k) the cell type (for example: macro cell, small cell, or the like) depending on the frequency band (first determination method). For example, when the frequency band is equal to or less than 3 GHz, the macro cell (for example: cellType#1) is determined. Alternatively, when the frequency band is equal to or more than 3 GHz or equal to or less than 6 GHz, the micro cell (for example: cellType#2) is determined. Alternatively, when the frequency band is equal to or more than 6 GHz, the small cell (for example: cellType#3) is determined.

Next, the C-RAN controller 3 determines (determines beam slice) the radio frame structure depending on the service type (sType(#k)) confirmed from the service type request category (sTypeReqCat#k). Since the resource characteristics of the subcarrier, the symbol, or the like that are required per service type is differently setup, the radio frame tile (radioFrameTile#k) having the predetermined structure is determined depending on the service type (sType(#k)) for the determined cell type (CT#k). If there are no corresponding matters, the service type is setup as "Best-effort internet". The radio frame tile per service type may be determined as follows, for example.
radioFrameTile#1 (sTypeReqCat for eMBB)
radioFrameTile#2 (sTypeReqCat for Low-latency(LL))
radioFrameTile#3 (sTypeReqCat for IoT) . . .
radioFrameTile#k (sTypeReqCat for Best-effort internet)
radioFrameTile#k (sTypeReqCat for eMBB & LL)

Meanwhile, even the beam slice may be determined as described above.

The beam slice may be determined using a massive MIMO technology, or the like based on a cellular band or a millimeter wave band.

Figure 12:
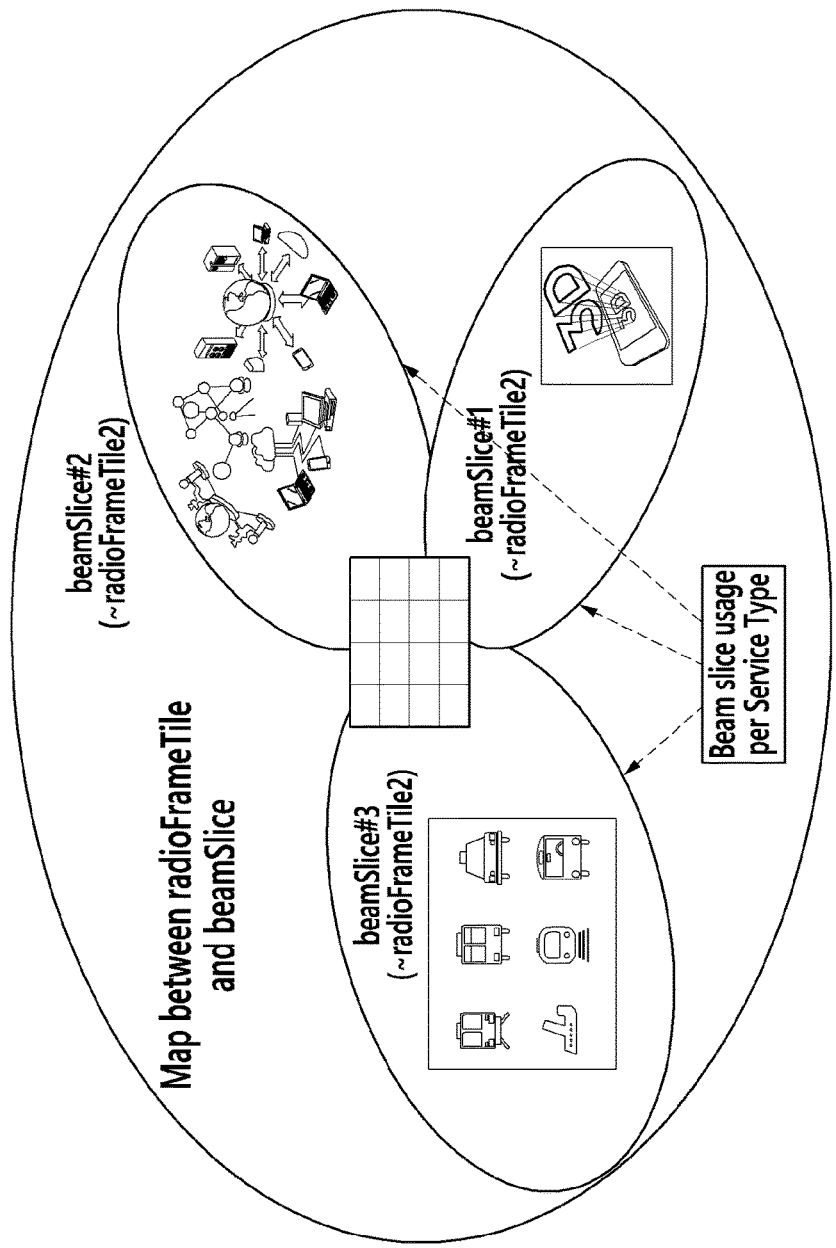
FIG. 12 is an exemplified diagram illustrating mapping between the radio frame tile and the beam slice according to an exemplary embodiment of the present invention.

FIG. 12 is an exemplified diagram illustrating mapping between the radio frame tile and the beam slice according to an exemplary embodiment of the present invention.

Classifying a multi beam radiated from the specific cell per service type is as exemplified in FIG. 12. In this case, the procedure of selecting any beam slice from beam slices configuring a multi beam is similar to the foregoing procedure of determining a radio frame tile.

The beam slices per service type may be mapped to the radio frame tile corresponding to the service type and may be mapped as follows, for example.
radioFrameTile#1→beamSlice#1 (sTypeReqCat for eMBB)
radioFrameTile#2→beamSlice#2 (sTypeReqCat for Low-latency(LL))
radioFrameTile#3→beamSlice#3 (sTypeReqCat for IoT)

As described above, if the cell type and the radio frame tile (or beam slice) are determined based on the information included in the secondary cell selection request message, the secondary cell is selected (for example: secondaryCell#k CT#k & RFP#k/BS#k).

Figure 13:
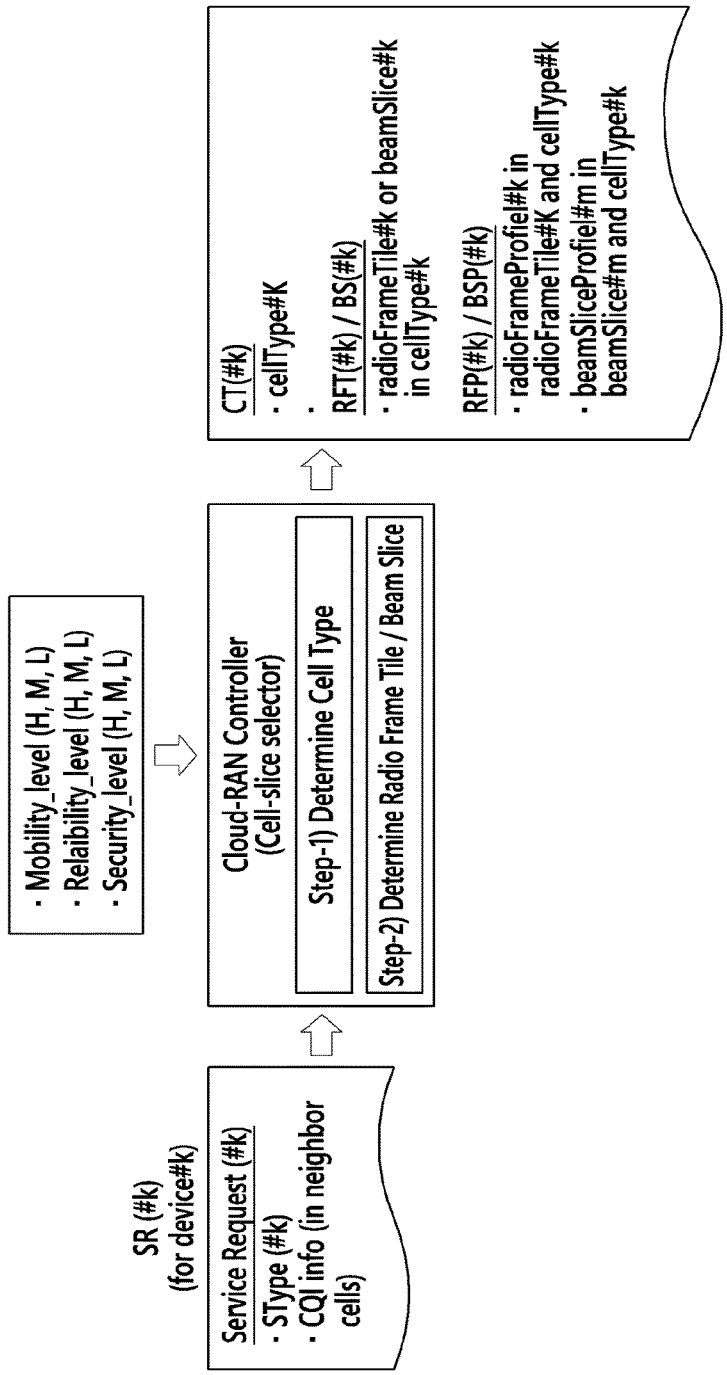
FIG. 13 is a diagram illustrating an example in which a cell type and radio frame tile/beam slice information are output as output information, according to an exemplary embodiment of the present invention.

FIG. 13 is a diagram illustrating an example in which a cell type and radio frame tile/beam slice information are output as output information, according to an exemplary embodiment of the present invention.

An example of an input/output model in which the network receives the service type request category (sTypeReqCat) of the device and the received signal strength of adjacent cells as the input information during the call setup and transmits the cell type (CT#k) and the radio frame tile information (RFP#k) or the beam slice information (BS#k) as the output information is illustrated in FIG. 13.

The C-RAN controller 3 adds the corresponding mobility level information (Mobility_level(high, medium, low)), reliability level information (Relaibility_level (high, medium, low)), security level information (Security_level information(high, medium, low)), or the like to radio frame tile profile information (RTP#k/BS#k) according to the required service type even when the device 1 does not provide the separate requirements for the mobility and security, thereby strengthening and adjusting the required relevant resource and function. For this purpose, the C-RAN controller 3 may use various types of service and application information that various devices request and use a big data application function (Analytic DB) to collect, analyze, and determine the resource/function information required to optimally provide the service and application information.

Meanwhile, after the radio frame structure is determined (or beam slice is determined), the C-RAN controller 3 configures the shape information of the uplink/downlink radio resource for the selected radio frame tile or beam slice and configures the shape information of the function element. The function shape configuration of the secondary cell may be performed in the network in non-real time or real time.

When the shape configuration of the secondary cell including the shape of the radio resource and the shape of the function element is configured in non-real time, the secondary cell shape configuration information (RFP#k/BS#k) may be statically setup, and may include, for example, the waveform type (waveform_type) multiple access scheme (multiple_access_scheme).

When the shape configuration of the secondary cell is configured in real time, the secondary cell shape configuration information (RFP#k/BS#k) may be dynamically setup and for example, the frequency resource (Frequency_resource), the time resource (Time resource), or the like may be determined depending on the traffic volume accumulated in the device and the site buffer of the secondary cell.

The shape of the secondary cell may be configured in both real time or non-real time (hybrid). This is to perform the programmable operation of the network equipments such as the device and the cell and prepare for the change in technology standard, or the like.

If the radio resource/function shape configuration of the secondary cell is completed, the C-RAN controller 3 transmits a secondary cell selection response message (SecondaryCellSelection Response) to the primary cell 21 (S340). The secondary cell selection response message includes the cell type information (CT#k) and the radio frame tile information (RTF#k) determined to correspond to the service type and further includes the secondary cell shape configuration information (RFP#k/BS#k). The integrated information included in the secondary cell selection response message is called the "secondary cell shape information". The relevant information element and message is transmitted to the primary cell through the open interface.

Next, the secondary cell is configured in the secondary cell shape configuration information for the resource/function determined by the network, that is, the C-RAN controller 3.

The primary cell 21 receives the secondary cell selection response message (SecondaryCellSelection Response) and configures the secondary cell designated depending on the secondary cell shape information (CT#k/RFT#k/RFP#k/BS#k) included in the message (S350).

The primary cell 21 transmits the secondary cell configuration request (SecondaryCellConfiguration Request) message including the secondary cell shape information (CT#k/RFT#k/RFP#k/BS#k) to the corresponding secondary cell 22 (S360). Therefore, the corresponding secondary cell 22 configures the shape information of the uplink/downlink radio resource in the corresponding radio frame tile depending on the secondary cell shape information (CT#k/RFT#k/RFP#k/BS#k) and configures the shape information of the function element. Next, the secondary cell 22 transmits the secondary cell configuration response (SecondaryCellConfiguration Response) message representing the configuration completion to the primary cell 21 (S370).

Meanwhile, the shape of the device is reconfigured depending on the secondary cell shape information (CT#k/RFT#k/RFP#k/BS#k). For this purpose, the radio connection reconfiguration (RadioConnectionReconfiguration) message is transmitted from the primary cell 21 to the device 1 (S380) and the device 1 reconfigures the shape (e.g., function, specification performance, or the like) of the device meeting the radio connection recognition message (S390).

The device 1 disregards the radio frame tile profile information (RFP#k) (or beam slice information (BS#k)) included in the radio connection reconfiguration message (RadioConnectionReconfiguration) if it is the same as the shape of the current device. Even in this case, to facilitate the programmable shape reconfiguration by the means for coping with the change in a technology standard version, or the like, the network (C-RAN controller 3) needs to transmit the radio frame tile profile information (RFP#k) or the beam slice information (BS#k) to the device 1. By using the same, the device 1 may reconfigure its own radio frame structure depending on the required information even when the technology standard is changed.

The device may reconfigure the radio frame structure as follows, for example.

> radioFrameTileProfile #1 for SType #1
>
> radioFrameTileProfile #2 for SType #2
>
> ...
>
> radioFrameTileProfile(#k) for STypet(#k)

If the reconfiguration is completed, the device 1 transmits a radio connection reconfiguration complete (RadioConnectionReconfiguration Complete) message notifying the completion of the reconfiguration to the primary cell 21 (S400). The primary cell 21 transmits the secondary cell configuration complete (SecondaryCellConfiguration Complete) message to the secondary cell 22 (S410). Further, the primary cell 21 transmits a secondary cell configuration complete report (SecondaryCellConfiguration Complete Report) message to the C-RAN controller 3 (S420). The C-RAN controller 3 may update DB of the shape information (for example, allocated wired/wireless resource size, or the like) used in the secondary cell as a target.

Next, a new call setup procedure (for example: random access, call admission. control, radio bearer allocation) between the device 1 and the new secondary cell 22 is performed (S430 and S440). The call setup procedure used herein may apply, for example, the existing signaling procedure (for example: signaling procedure in the LTE) and the detailed process thereof is known, and therefore the detailed description thereof will be omitted.

The device 1 is connected to the secondary cell 22 through the call setup procedure (S450).

Meanwhile, the device (or primary cell or network (C-RAN controller)) may change the service requirements during the communication between the device and the secondary cell.

When the secondary cell is sequentially changed (for example: CT#k/RFT#k→CT#k+1/RFT#k+1) according to the change in the service requirements, the basic procedure thereof is based on the above-mentioned procedure (Primary cell=>secondary cell#k). In this case, the connection to other secondary cells may be made without releasing the existing connected secondary cell and the multi-connection transmission may be made through the connection to the plurality of secondary cell.

Here, the connection to the secondary cell is described based on the radio frame tile and the procedure based on the beam slice is basically performed like the above-mentioned procedure, and therefore the detailed description thereof will be omitted.

As described above, according to the exemplary embodiment of the present invention, the optimal network slice shape meeting characteristics for various user cases may be flexibly configured based on the network slice structure. As a result, the subscriber receives the optimal communication environment and therefore may be surprisingly improved the communication quality of experience. Further, the operator may provide service acceptance easiness, cost reduction, and differentiated network infrastructure.

Figure 14:
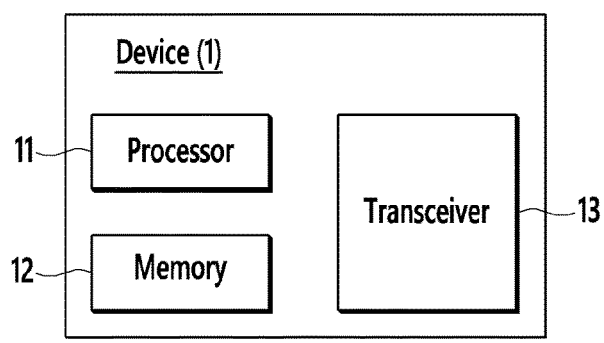
FIG. 14 is a configuration diagram of a device according to an exemplary embodiment of the present invention.

FIG. 14 is a configuration diagram of a device according to an exemplary embodiment of the present invention.

As illustrated in FIG. 14, the device 1 according to the exemplary embodiment of the present invention includes a processor 11, a memory 12, and a transceiver 13. The processor 11 may be configured to implement the methods described based on FIGS. 1 to 13.

The memory 12 is connected to the processor 11 and stores various information associated with an operation of the processor 11. The memory may store instructions to be executed by the processor 11 or load instructions from a storage apparatus (not illustrated) and temporarily store the loaded instructions. The processor 11 may execute the instructions stored or loaded in the memory 12. The processor 11 and the memory 12 are connected to each other through a bus (not illustrated) and an input/output interface (not illustrated) may also be connected to the bus.

Figure 15:
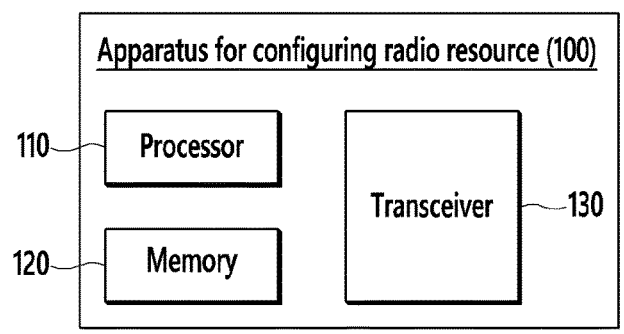
FIG. 15 is a configuration diagram of an apparatus for configuring a radio resource according to an exemplary embodiment of the present invention.

FIG. 15 is a configuration diagram of an apparatus for configuring a radio resource according to an exemplary embodiment of the present invention.

As illustrated in FIG. 15, a radio resource configuration device 100 according to the exemplary embodiment of the present invention includes the processor 110, the memory 12, and the transceiver 130.

The processor 110 may be configured to implement the methods described based on FIGS. 1 to 13.

The memory 120 is connected to the processor 110 and stores various information associated with an operation of the processor 110. The memory may store instructions to be executed by the processor 110 or load instructions from a storage apparatus (not illustrated) and temporarily store the loaded instructions. The memory 120 may include NS-DB.

The processor 110 may execute the instructions stored or loaded in the memory 120. The processor 110 and the memory 120 are connected to each other through a bus (not illustrated) and an input/output interface (not illustrated) may also be connected to the bus.

The radio resource configuration device 100 may perform an operation of determining, by the C-RAN controller, a radio frame structure (or beam slice) according to the service type and selecting and configuring the secondary cell.

According to the exemplary embodiment of the present invention, the wireless communication system may provide the customized radio frame according to various service requirements, based on the radio frame tiling technology using the virtualization of the radio frame resource. Further, the customized beam slice may be provided according to various service requirements based on the beam slicing. Therefore, the service quality of experience of the subscriber may be improved. Further, the operator may improve the use of the frequency resource, the overhead of the radio channel, and simplify the radio interface between the terminal/base station.

The exemplary embodiments of the present invention are not implemented only by the apparatus and/or method as described above, but may be implemented by programs realizing the functions corresponding to the configuration of the exemplary embodiments of the present invention or a recording medium recorded with the programs, which may be readily implemented by a person having ordinary skill in the art to which the present invention pertains from the description of the foregoing exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for configuring a radio resource in a wireless communication system, comprising:
a transceiver transmitting/receiving a signal through an antenna; and
a processor connected to the transceiver and performing a configuration of the radio resource,
wherein the processor splits the radio resource into a plurality of radio resource slices corresponding to different service types and determines the radio resource slice corresponding to the service type that a device requests, among the plurality of radio resource slices,
wherein the plurality of radio resource slices includes a first radio resource slice that is allocated to the device based on an initial connection of the device with the apparatus, and a second plurality of radio resource slices corresponding to the different service types, and
wherein the processor is configured to change the radio resource allocated to the device from the first radio resource to one of the second plurality of radio resources based on determining the service type that the device requests.

2. The apparatus of claim 1, wherein:
the radio resource is a radio frame resource including a frequency resource and a time resource and each of the radio frame resources is split into a plurality of radio frame tiles corresponding to the different service types.

3. The apparatus of claim 2, wherein:
the radio frame resource is split into a plurality of radio frame tiles based on any one of
a method of splitting the radio frame resource into a plurality of radio frame tiles based on a frequency resource,
a method of splitting the radio frame resource into the plurality of radio frame tiles based on a time resource,
a method of splitting the radio frame resource into the plurality of radio frame tiles based on a third resource that is at least one of power and a code, and
a method of randomly splitting the radio frame resource into the plurality of radio frame tiles based on the frequency resource and the time resource.

4. The apparatus of claim 1, wherein:
when a spatial division multi-beam is used, the radio resource is beam resources and each of the beam resources is split into a plurality of beam slices corresponding to different service types.

5. The apparatus of claim 4, wherein:
beam slices corresponding to the different service types are generated by adjusting at least one of a coverage, a beam width, and a beam angle of the beam resources.

6. The apparatus of claim 1, wherein:
the wireless communication network system include:
a primary cell access network; and
at least one secondary cell access network added according to the service type that a device requests, and
the processor allocates radio resource slices corresponding to the different service types to the primary cell access network and the secondary cell access network, respectively.

7. An apparatus for configuring a radio resource in a wireless communication system, comprising:
a transceiver transmitting/receiving a signal through an antenna; and
a processor connected to the transceiver and performing a configuration of the radio resource,
wherein the processor splits the radio resource into a plurality of radio resource slices corresponding to different service types and determines the radio resource slice corresponding to the service type that a device requests, among the plurality of radio resource slices,
wherein the wireless communication network system include:
a primary cell access network; and
at least one secondary cell access network added according to the service type that a device requests, and
the processor allocates radio resource slices corresponding to the different service types to the primary cell access network and the secondary cell access network, respectively, and
wherein the primary cell access network is an access network connected as a default when trying a new connection according to a new call, and
the processor connects the device connected through the primary cell access network to a secondary cell access network corresponding to the service type that the device requests.

8. A wireless communication system, comprising:
a primary cell access network; and
at least one secondary cell access network added according to a service type that a device requests,
wherein radio resource slices corresponding to different service types are allocated to the primary cell access network and the secondary cell access network, respectively,
wherein the radio resource slices include a first radio resource slice that is allocated to the primary cell access network and the at least one secondary cell access network based on an initial connection of the device with the apparatus, and a plurality of second radio resource slices corresponding to the different service types, and
wherein a radio resource slice allocated to the primary cell access network and the at least one secondary cell access network is changed from the first radio resource slice to one of the plurality of second radio resource slices based on determining the service type that the device requests.

9. The wireless communication system of claim 8, wherein:
the radio resource is a radio frame resource including a frequency resource and a time resource and the radio frame resources are each split into a plurality of radio frame tiles corresponding to the different service types.

10. The wireless communication system of claim 8, wherein:
when a spatial division multi-beam is used, the radio resource is a beam resource and the beam resources are each split into a plurality of beam slices corresponding to different service types.

11. A wireless communication system, comprising:
a primary cell access network; and
at least one secondary cell access network added according to a service type that a device requests, wherein radio resource slices corresponding to different service types are allocated to the primary cell access network and the secondary cell access network, respectively, and wherein the primary cell access network is an access network corresponding to a cell having a largest coverage radius while received strength among received signal strengths of adjacent cells that a device reports is equal to or more than a communication quality threshold value and is a network connected as a default when trying a new connection according to a new call.

12. The wireless communication system of claim 11, further comprising:

an access network controller determining a secondary cell access network and a radio resource slice which correspond to a service type that the device connected through the primary cell access network requests and notifying the device of the determined secondary access network and radio resource slice.

13. The wireless communication system of claim 12, wherein the device is connected to the secondary cell access network notified from the access network controller to form a multi-connection state, in a state in which maintaining a connection with the primary cell access network.

14. A method for configuring a radio resource in a wireless communication system, comprising:

splitting, by an apparatus for configuring a radio resource, the radio resource into a plurality of radio resource slices corresponding to different service types and determining a radio resource slice corresponding to a service type that a device requests; and notifying, by the apparatus for configuring a radio resource, the device of the determined radio source slice, wherein the plurality of radio resource slices includes a first radio resource slice that is allocated to the device based on an initial connection of the device with the wireless communication system, and a plurality of second radio resource slices corresponding to the different service types, and wherein the method includes changing the radio resource allocated to the device from the first radio resource slice to one of the plurality of second radio resource slices based on determining the service type that the device requests.

15. The method of claim 14, wherein the determining includes:

receiving, by the apparatus for configuring a radio resource, a message including a service type from the device;

determining, by the apparatus for configuring a radio resource, an access network corresponding to the service type; and determining, by the apparatus for configuring a radio resource, a radio resource slice corresponding to the service type.

16. The method of claim 15, wherein the notifying includes:

providing, by the apparatus for configuring a radio resource, information on the determined radio resource slice to the determined access network; and providing, by the apparatus for configuring a radio resource, information on the determined access network and radio resource slice to the device.

17. The method of claim 15, wherein in the determining, the apparatus for configuring a radio resource determines one of a plurality of secondary cell access networks based on a service type acquired from the device connected through a primary cell access network.

18. The method of claim 14, wherein the radio resource is a radio frame resource including a frequency resource and a time resource and the radio frame resources are each split into a plurality of radio frame tiles corresponding to the different service types.

19. The method of claim 14, wherein:

when a spatial division multi-beam is used, the radio resource is beam resources and each of the beam resources is split into a plurality of beam slices corresponding to different service types.

* * * * *